Patented Feb. 25, 1930

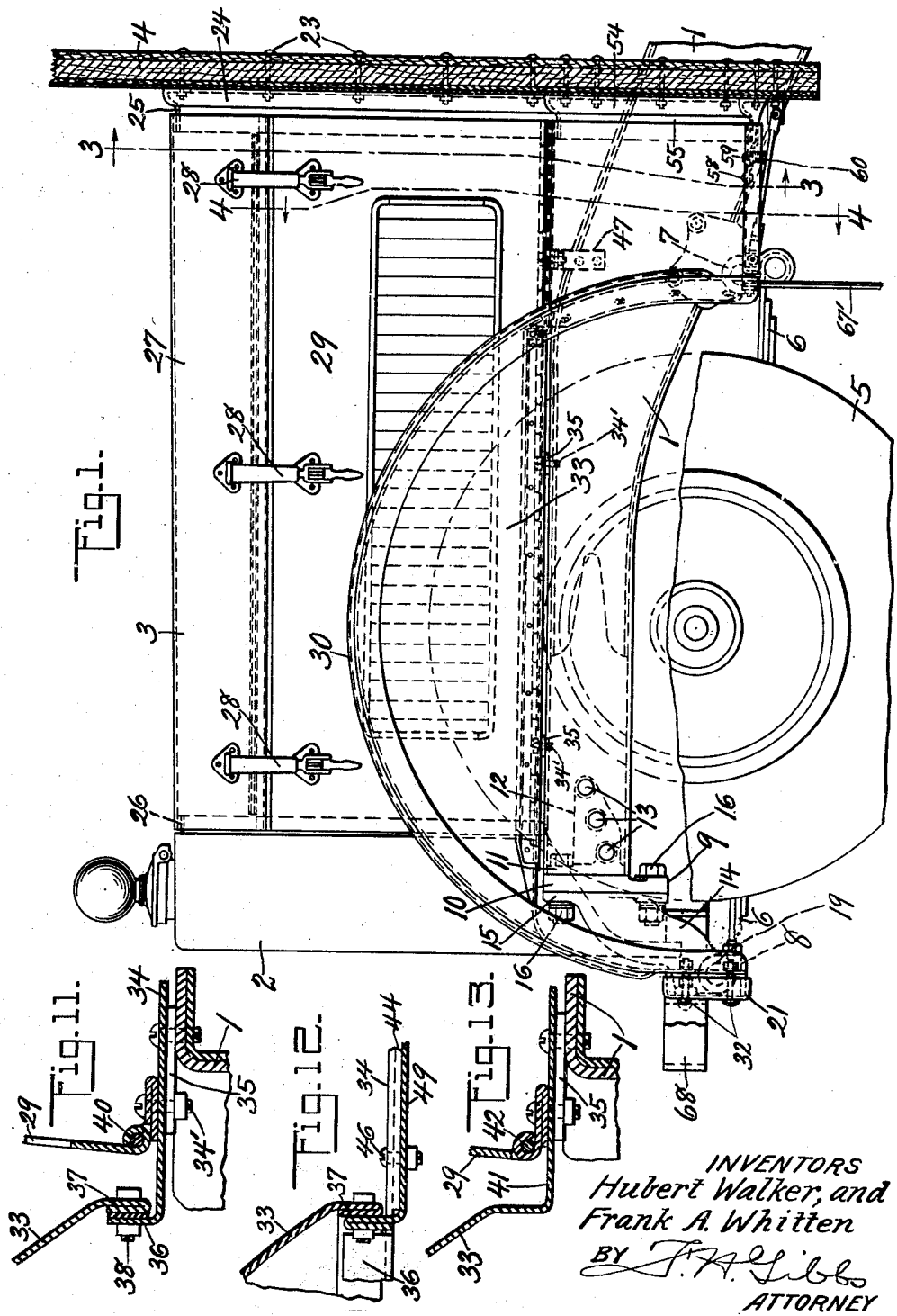

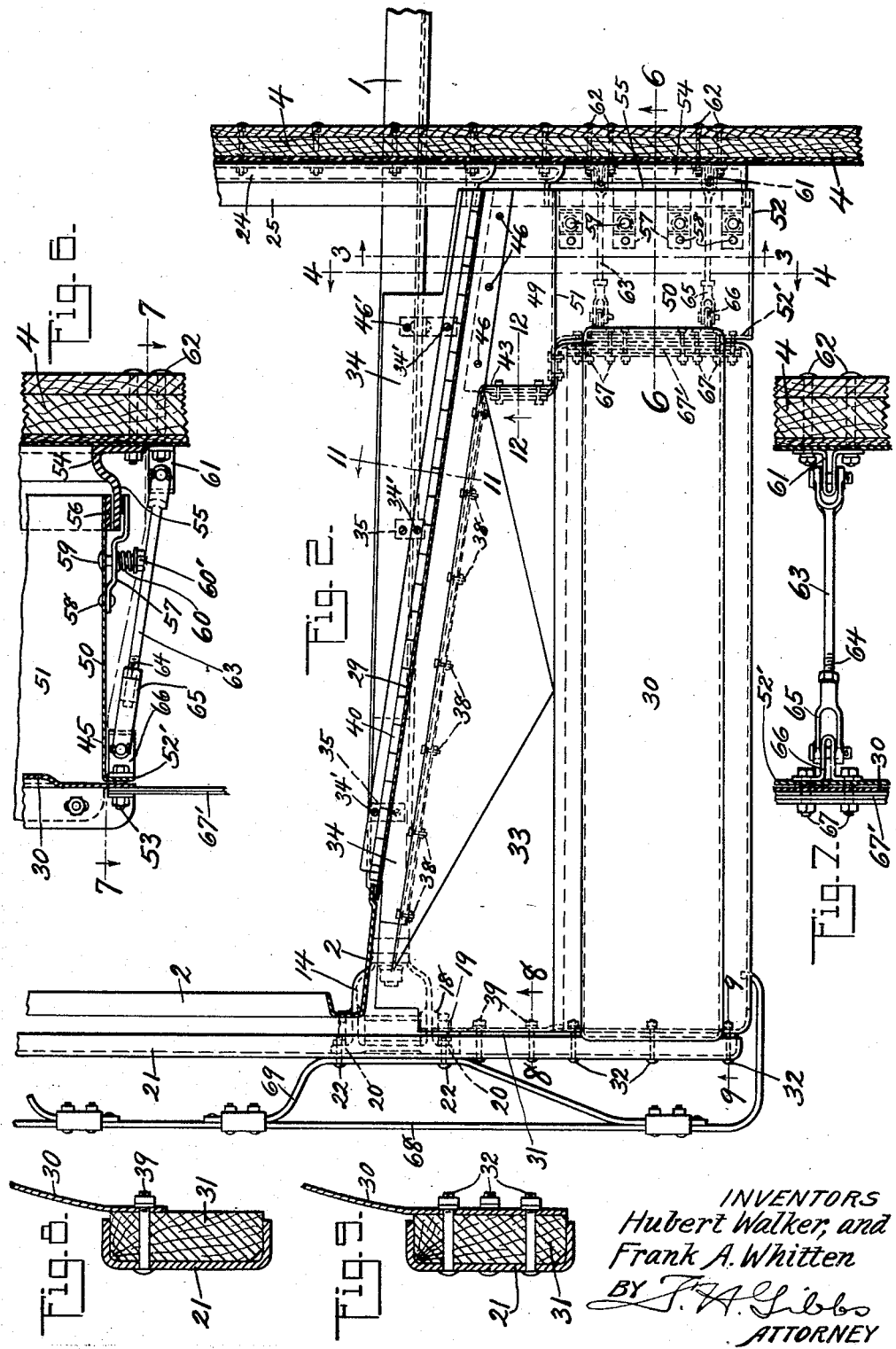

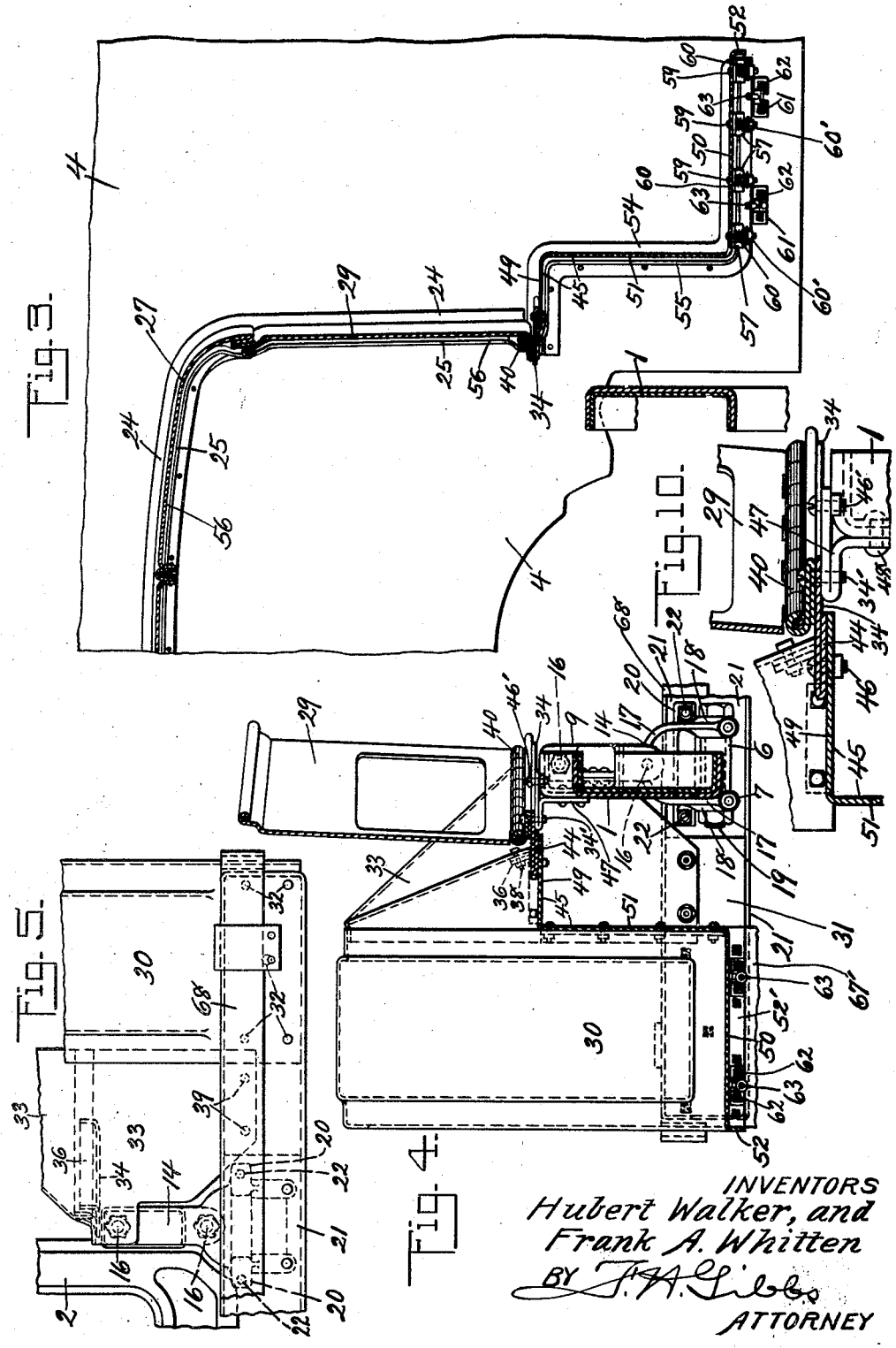

1,748,157

UNITED STATES PATENT OFFICE

HUBERT WALKER, OF ROYAL OAK, AND FRANK A. WHITTEN, OF DETROIT, MICHIGAN, ASSIGNORS TO AMERICAN CAR AND FOUNDRY MOTORS COMPANY, OF NEW YORK, N. Y., A CORPORATION OF DELAWARE

VEHICLE BUMPER AND FENDER AND MOUNTING MEANS THEREFOR

Application filed July 20, 1927. Serial No. 207,147.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a side elevation, partly in section, of the front end of a motor vehicle showing the present invention;

Fig. 2 is a fragmentary top plan view, partly in section, of the front end of a motor vehicle showing the present invention;

Fig. 3 is a sectional view on the line 3—3, Fig. 2;

Fig. 4 is a sectional view on the line 4—4, Fig. 2;

Fig. 5 is a front elevation of one of the fenders with its apron and the bumper structure connected therewith, also showing a part of the radiator;

Fig. 6 is a sectional view on the line 6—6, Fig. 2;

Fig. 7 is a sectional view on the line 7—7, Fig. 2;

Fig. 8 is a sectional view on the line 8—8, Fig. 2;

Fig. 9 is a sectional view on the line 9—9, Fig. 2;

Fig. 10 is a detail sectional view of a portion of Fig. 4, showing the connections of the sill and hood;

Fig. 11 is a sectional view on the line 11—11, Fig. 2;

Fig. 12 is a sectional view on the line 12—12, Fig. 2;

Fig. 13 is a view similar to Fig. 11, but showing a modified form of apron and its connection to the chassis frame side member.

This invention relates to a bumper and fender for motor vehicles and has particular reference to mounting means therefor.

The present invention has for its main object the provision of a strong and durable construction of the character specified.

A further object of the invention is the provision of a combined fender and bumper or bumper channel.

Another object of the invention is to provide a fender mounting which will permit relative movement between the body and frame of the vehicle on the one hand, and the fender on the other hand, during operation of the vehicle whereby to eliminate strains to which the fender is normally subjected in use and thus prevent breakage or multilation of the fender and its mounting means.

Other objects and advantages of this invention will be apparent from the following description taken in conjunction with the accompanying drawings in which, in Fig. 1, the front end of a motor vehicle is shown and comprises a chassis frame side member 1, a radiator 2, and a hood 3. The numeral 4 indicates a portion of the body of the vehicle, more particularly that part adjacent the cowl and which may be termed a body dash. As is usual, wheels 5 are provided, the same being mounted on the spring 6 secured to the rear shackle 7 and the front shackle 8.

Attached to the end of the chassis frame side member 1 is a main bracket 9 having a head portion 10 arranged in abutting relation with the extreme end of the member 1, the latter, as is usual, being of channel form. The head 10 carries a rearwardly extending integral shoulder 11 which is received within the channel between the upper and lower chords thereof, and for the purpose of attaching the bracket 9 to the channel or side member 1 an attaching leg 12 is provided which is secured to the web of the channel 1 by means of the rivets 13. This main bracket 9 is formed so as to abut the end of the channel, as stated, and its lower end extends below the lower chord of the channel, as clearly shown in Fig. 1. The bracket 9 serves to support an auxiliary depending bracket 14 having an attaching face 15 by which it is secured to the bracket 9 by means of the bolts 16. Referring now to Fig. 4, it can be seen that the lower end of the auxiliary bracket 14 is bifurcated, forming opposed arms 17 which terminate in eyes 18 which eyes take the shackle bolt 19 of the forward end of spring 6; the spring 6 being mounted thereon. The auxiliary bracket 14 also carries attaching flange 20 to which is secured a bumper channel 21 by means of the bolts 22; the bumper channel extending entirely across the front of the vehicle and being mounted on the opposite frame side member in a manner similar to that just described. In the drawings only one side of the vehicle is shown, but it is to be understood that the parts herein shown and described are duplicated on the other side of the vehicle and therefore a description of one set will suffice for all.

The body portion 4 has secured thereto by means of bolts 23 a casting 24 having a supporting flange 25 for mounting the hood 3 at its rear end. The forward end of the hood 3 is supported by a flange 26 formed at the radiator 2, and in the instance shown, the hood 3 comprises a top 27 connected as shown at 28 to the sides 29; the latter being hingedly secured at the lower edges thereof to the vehicle frame as hereinafter described.

The vehicle fender is indicated at 30 and is of the usual arcuate form. The front end of the fender is extended downwardly adjacent the bumper channel 21 and, as shown clearly in Figs. 8 and 9, said channel is provided with a filler block 31 to which the end of the fender is secured by means of bolts 32, thus providing a rigid front connection and mounting for the fender.

The fender 30 is provided with an apron 33 which may be formed integral therewith or be formed of a separate piece of material secured thereto as desired. The apron is connected to the chassis frame side member 1 and the particular connection is illustrated in detail in Figures 11 and 13. Referring now to Fig. 11 and also to Fig. 2, it can be seen that a tie plate 34 is secured to the chassis frame side member 1, the plate 34 being preferably reinforced by carry plates 35. The tie plate has its free edge formed into an attaching flange 36 and the lower edge of the apron 33 is folded as shown at 37 to lie adjacent this flange 36; suitable anti-squeak material being interposed between the flange 36 and the fold 37. The flange 36 and fold 37 are connected together by means of bolts 38. As shown clearly in Fig. 2, the forward end of the apron 33 is secured to the bumper channel 21 by means of bolts 39. Referring again to Fig. 11, the hood side 29 is hingedly secured, as shown at 40, to the tie plate 34 by means of the bolts 34'. As before mentioned, Fig. 13 discloses a modified form of construction and in this figure it can be seen that the apron 33 and tie plate are formed in a unitary structure, the apron 33 being provided with an attaching flange 41 secured to the channel 1 through the carry plate 35, and the hood side 29 is hingedly secured as shown at 42 to this flange 41.

The tie plate 34 is reduced in width at the rear end, from a point adjacent the rear end 43 of the apron, and in Figs. 4 and 10 it can be seen that a part of the tie plate from adjacent said end 43 to the end of said tie plate is folded under the remaining portion as clearly indicated at 44, thus forming a stiffening attaching section for a sill 45 which latter is secured to said stiffened portion of the tie plate by bolts 46 or the like. The tie plate 34 at this end is attached to the channel 1 by means of bolts 46' extending through said tie plate and through a substantially T-shaped bracket 47 secured to the channel 1 by means of rivets 48.

As clearly indicated in Fig. 4, the sill 45 is substantially Z-shaped, having the upper chord 49, lower chord 50 and web 51; the lower chord having a depending flange 52 along its outer edge and an attaching flange 52' along the side adjacent the end of the apron and fender 30. Bolts 53 are provided which extend through the flange 52' and the end of the fender and apron for attaching or connecting the sill 45 to said apron and fender, as more particularly shown in Fig. 6. The free end of the sill 45 is mounted on but is free of attachment with a substantially Z-shaped casting 54 secured to the dash 4, having a mounting flange 55 formed therewith (see Fig. 3), and we preferably attach to the sill 45 adjacent the rear end thereof a suitable anti-squeak material 56 for an obvious purpose.

For providing a resilient connection between the lower chord 50 of the sill 45 and the attaching flange 55, a plurality of spring-pressed retainers 57 are attached to the chord 50 by rivets 58 and the free ends of said retainers extend under the flange 55 (see Fig. 6). A bolt 59 is provided for each retainer, the bolts each carrying a spring 60 interposed between the retainer and the nut 60' carried by the bolt 59. With the construction just described it is apparent that the connection between the flange 55 and the lower chord 50 is a resilient one and the bolts and retainer elements function to maintain a proper positioning of the chord 50 with respect to the flange 55.

Due to the strains to which a vehicle is subjected, it has been found that a rigid connection of the sill 45 with the frame is undesirable and presents disadvantages in that sometimes the fender will be broken or bent. To eliminate these disadvantages and still maintain the desired construction of these elements of the vehicle, I provide a generally flexible connection between the fender and the dash 4, the same comprising a plurality of adjustable connecting members, one of which is particularly shown in Fig. 7 and comprises a bracket 61 secured to the dash 4 by bolts 62, said bracket pivotally supporting the bifurcated rear end of a tie rod 63. The free end of the rod 63 is threaded as at 64 to secure a clevis 65 which is pivotally connected to a bracket 66 attached to the end of the fender 30 and the flanged end of the sill 45 by bolts 67, a suitable flexible mud guard extension or anti-splash element 67' also being provided at the lower end of the fender 30 for an obvious purpose. In practice we have found that only two of these tie connections are required, but obviously any number may be employed as desired.

While the assemblage just described provides an excellent mounting for the fender and also furnishes an adequate bumper device, we find it desirable to provide a spring bumper in connection with the bumper channel, and to that end we attach a spring tie bumper 68 to the bumper channel 21 by means of the spring mounts 69 which are connected by means of the bolts 22, heretofore mentioned, as clearly shown in Fig. 2.

From the above description it is believed that it will be apparent to those skilled in the art that the fender 30 is rigidly mounted and still is capable of relative movement with respect to the body of the vehicle. It is further apparent that we have provided a rigid mounting for the fender at the front end thereof by connecting said front end to a bumper channel in a rigid manner through the medium of the bolts heretofore specified.

What is claimed is:

1. In a motor vehicle having a chassis frame side member and a body, a bracket secured to the side member, a fender secured to the side member, means carried by the bracket for securing the front end of the fender, a sill secured to the side member and the rear end of the fender, and a flexible connection between the rear end of the fender and the body.

2. In a motor vehicle having a chassis frame side member and a body, a bumper channel positioned across the front of the vehicle, a fender secured to the side member and to said bumper channel, a sill connected to the rear end of the fender, means secured to the body for mounting the sill, and a flexible connection between the rear end of the fender and the body permitting relative movement between the fender and sill and the body.

3. In a motor vehicle having a chassis frame side member and a body, a fender secured to said side member, a sill secured to said side member and fender, a casting secured to the body for mounting said sill, and adjustable flexible means connecting the fender and body.

4. In a motor vehicle having a chassis frame side member and a body, a fender secured to the side member, a sill connected to the side member and fender, a casting secured to the body and mounting the end of said sill, and pivotal means connecting the rear end of the fender and said body whereby to permit relative movement therebetween.

5. In a motor vehicle having a chassis frame side member and a body, a tie plate secured to the side member, a fender, an apron secured thereto and to the tie plate, a sill secured to the tie plate and to the fender, means secured to the body for mounting said sill, and flexible means connecting said fender and body.

6. In a motor vehicle having a chassis frame side member and a body, a fender secured to the side member, a sill secured to the side member and fender, mounting means for the sill carried by the body, resilient retainer elements secured to the sill for positioning the latter with respect to the mounting means, and flexible means connecting the fender and the body.

7. In a motor vehicle having a chassis frame side member and a body, a bracket secured to the side member in abutting relation, a bumper channel carried by said bracket, a fender secured to the side member and connected at its forward end to the bumper channel, a sill secured to the rear end of the fender and to the side member, means secured to the body for mounting the end of said sill, resilient means secured to the sill and engaging the sill mounting means for positioning the sill, and pivotal means connecting the rear end of the fender to the body to permit relative movement between the fender and body.

8. In a motor vehicle having a chassis frame side member and a body, a fender secured to the side member, a sill secured to to the side member and fender, a casting secured to the body and having a mounting flange for supporting said sill, resiliently mounted retainer elements secured to the sill and engaging the mounting flange for positioning the sill, and a plurality of adjustable tie rods connecting the fender and body to permit relative movement therebetween.

9. In a motor vehicle having a chassis frame side member and a body, a bumper channel connected to the side member, a fender rigidly secured to the side member and bumper channel and flexibly connected to the body, a sill connected to the side member and fender, and a sill mounting means secured to the body.

10. In a motor vehicle having a chassis frame side member and a body, a bumper channel connected to the side member, a fender rigidly secured to the side member and bumper channel and flexibly connected to the body, a sill connected to the side member and fender, a sill mounting means secured to the body, and resilient retainer elements secured to the sill and engaging the sill mounting means to position said sill.

11. In a motor vehicle having a chassis frame side member and a body, a fender secured to the side member and means connecting said body and fender comprising adjustable tie rods pivotally secured to said fender and body.

12. In a motor vehicle having a chassis frame side member and a body, a fender secured to the side member and means for connecting said fender and body to permit relative movement therebetween comprising pivotally mounted tie rods secured to said fender and body.

13. In a motor vehicle having a chassis frame side member and a body, a fender secured to the side member and means for connecting said fender and body to permit relative movement therebetween comprising pivotally mounted adjustable tie rods secured to said fender and body.

14. In a motor vehicle, a chassis side member and a body, a fender connected to the side member, oppositely arranged brackets secured to the fender and body respectively, and tie rods secured to said brackets for connecting the rear end of the fender to the body.

15. In a motor vehicle, a chassis side member and a body, a fender connected to the side member, oppositely arranged brackets secured to the fender and body respectively, and tie rods pivotally secured to said brackets for connecting said fender and body.

16. In a motor vehicle, a chassis side member and a body, a bumper channel connected to the side member, a fender rigidly secured at its forward end to the bumper channel and tie rods pivotally connecting the rear end of said fender and the body to permit relative movement therebetween.

17. In a motor vehicle, a chassis side member and a body, a bumper channel connected to the side member, a fender rigidly secured at its forward end to the bumper channel, and pivoted means connecting the rear end of the fender and said body to permit relative movement therebetween, said means being adjustable to maintain a tight connection of said fender and body.

In witness whereof we have hereunto set our hands.

HUBERT WALKER.
FRANK A. WHITTEN.